June 19, 1962   M. B. PREEMAN   3,039,747
MIXER TIP WITH SHANK SHROUD
Filed Jan. 18, 1960
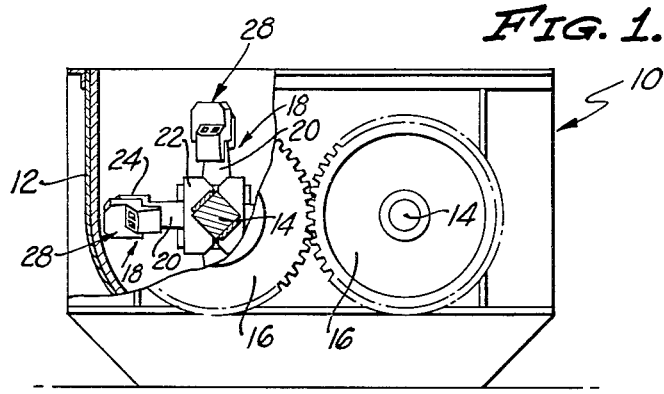
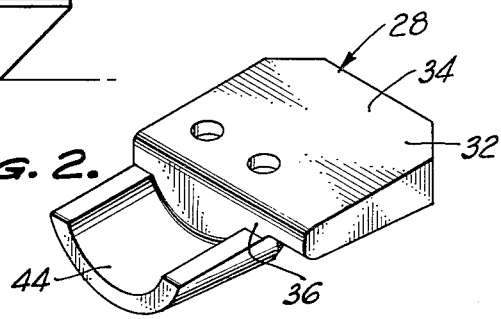
INVENTOR
MARVIN B. PREEMAN
BY HIS ATTORNEYS
HARRIS, KIECH, RUSSELL & KERN United States Patent Office 3,039,747
Patented June 19, 1962

3,039,747
MIXER TIP WITH SHANK SHROUD
Marvin B. Preeman, Los Angeles, Calif., assignor to Standard Steel Corporation, Los Angeles, Calif., a corporation of California
Filed Jan. 18, 1960, Ser. No. 2,968
1 Claim. (Cl. 259—136)

The present invention relates in general to apparatus for preparing asphalt mixes, or mixes of other materials, and a primary object of the invention is to provide means for minimizing wear of mixing devices embodied in such apparatus.

A mixer of the type to which the present invention is particularly applicable includes a casing or housing having therein shafts rotating in timed relation and carrying generally radial mixing devices or mixer teeth each comprising a generally radial mixer shank connected to one of the shafts at its inner end and having a hardened mixer tip mounted thereon at its outer end. Prior mixers of the foregoing type are subject to considerable wear of the mixer shanks radially inwardly of the mixer tips, particularly when handling such abrasive materials as those utilized in the preparation of asphalt mixes, and the basic object of the invention is to minimize such shank wear.

More particularly, an important object of the invention is to provide a mixer tip which includes an outer mixer element and integral therewith an inner shroud overlying the front side of the mixer shank and extending inwardly toward the inner end thereof, the front side of the mixer shank being the one which faces in the direction of rotation of the corresponding shaft. A related object is to provide a protective shroud in the form of a skirt of annular cross section overlying the front side of the mixer shank and extending inwardly toward the inner end thereof.

Another object of the invention is to connect the mixer tip to the mixer shank substantially centrally of the combined frontal areas of the mixing element and the shroud in a direction inwardly and outwardly of the shank. Thus, moments applied to the mixer tip radially inwardly and outwardly of the connecting means by the pressure of the materials being mixed are substantially cancelled out.

The foregoing objects, advantages, features and results of the present invention, together with various other objects, advantages, features and results thereof which will be evident to those skilled in the art in the light of this disclosure, may be attained with the exemplary embodiment described in detail hereinafter and illustrated in the accompanying drawing, wherein:

FIG. 1 is an end view, partially in section, showing a mixer which embodies the mixer tip of the invention;

FIG. 2 is a perspective view of the mixer tip;

FIG. 3 is a front elevational view of the mixer tip mounted on a mixer shank; and FIG. 4 is a sectional view taken along the arrowed line 4—4 of FIG. 3.

In the drawing, the mixer is designated generally by the numeral 10 and includes a casing or housing 12 which contains shafts 14 interconnected to rotate in timed relation by gears 16. Generally radial mixer teeth 18 are mounted on the shafts 14. The foregoing general structure of the mixer 10 is well known so that a further description is unnecessary, the invention residing in the particular construction of the mixer teeth 18, one of which is shown in detail in FIGS. 2 to 4 of the drawing and will now be described.

Each mixer tooth 18 includes a generally radial shank 20 having means 22 at its inner end for connecting it to the corresponding shaft 14. The shank 20 is provided at its outer end with a flange 24 having a front surface 26 facing generally in the direction of rotation of the corresponding shaft 14. The front surface 26 of the flange 24 is not perpendicular to the orbital path of such flange, but is skewed relative thereto so as to correspondingly skew a mixer tip 28 carried by the shank 20, as is well known in the art. The front surface 26 of the flange 24 merges with a shoulder 30 located at the junction of the flange 24 and the body of the shank 20 and disposed in the plane perpendicular to the axis of the shank.

The mixer tip 28 includes an outer, paddle-like mixing element 32 which is provided with a rear surface 34 and a shoulder 36 respectively complementary to and seated against the front flange surface 26 and the shoulder 30, the mixing element 32 extending radially outwardly beyond the flange 24 and extending laterally beyond at least one edge thereof, as best shown in FIG. 3 of the drawing. The mixer tip 28 is secured to the outer end of the shank 20 by bolts 38 extending rearwardly through the mixing element 32 and the flange 24 and secured by nuts 40. The heads of the bolts 38 are recessed into the front side of the mixer tip 28, the latter being provided with recesses 42 for the purpose.

Integral with the mixing element 32 of the mixer tip 28 is an inner shroud 44 which overlies the front side of the shank 20 and which extends inwardly toward the inner end of the shank, the shroud extending radially inwardly to such an extent, as best shown in FIG. 1, as to shield a substantial portion of the length of the shank against the abrasive action of materials being mixed in the housing 12. The shroud 44 consists of a skirt of arcuate cross section which extends radially inwardly from the mixing element 32, the shroud having an angular extent of the order of 120° so that it shields the entire front side of the portion of the shank 20 which it overlies, as will be clear from FIG. 3 of the drawing.

The entire mixer tip 28, including the mixing element 32 and the shroud 44, is made of a hard, abrasion resistant material to minimize wear thereof. Since the shroud 44 overlies a substantial portion of the front side of the shank 20, it minimizes wear of the shank so that one shank will outwear a number of the mixer tips.

The connecting means for the mixer tip 28 which is formed by the bolts 38 is substantially centrally located relative to the combined frontal areas of the mixing element 32 and the shroud 44 with reference to the direction of the axis of the shank 20, this being perhaps best shown in FIG. 4 of the drawing. Consequently, moments resulting from pressure forces applied radially inwardly and radially outwardly of the bolts 38 as the result of the resistance offered by the materials being mixed, are substantially cancelled out. Thus, the bolts 38 are subjected to minimum stress, which is an important feature.

Although an exemplary embodiment of the invention has been disclosed herein for purposes of illustration, it will be understood that various changes, modifications and substitutions may be incorporated in such embodiment without departing from the spirit of the invention as defined by the claim which follows.

I claim:

A mixer tooth adapted to be mounted on a rotatable mixer shaft, and including: a mixer shank having inner and outer ends and a front side and connectible to the mixer shaft at said inner end thereof with said front side thereof facing in the direction of rotation of the mixer shaft; a mixer tip mounted on said mixer shank at said outer end thereof and on said front side thereof, said mixer tip including an outer mixing element and including an integral inner shroud overlying said front side of said mixer shank and extending inwardly toward said inner end thereof, said shroud being of arcuate across section transversely of said mixer shank and extending laterally beyond the margins of said front side of said mixer shank and then extending rearwardly behind said front side of said mixer shank; and means connecting said mixer tip to said outer end of said mixer shank.

References Cited in the file of this patent

UNITED STATES PATENTS

| | | |
|---|---|---|
| 268,029 | Krause | Nov. 28, 1882 |
| 1,880,626 | Wilmoth | Oct. 4, 1932 |
| 2,570,042 | West | Oct. 2, 1951 |
| 2,588,434 | Unti et al. | Mar. 11, 1952 |